United States Patent
Lai

(10) Patent No.: US 7,277,493 B2
(45) Date of Patent: Oct. 2, 2007

(54) EQUALIZATION IN ORTHOGONAL FREQUENCY DOMAIN MULTIPLEXING

(75) Inventor: Yhean-Sen Lai, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 813 days.

(21) Appl. No.: 10/352,669

(22) Filed: Jan. 28, 2003

(65) Prior Publication Data

US 2004/0146123 A1 Jul. 29, 2004

(51) Int. Cl.
H04L 27/28 (2006.01)
H04L 1/00 (2006.01)
H04B 1/10 (2006.01)
(52) U.S. Cl. .................. 375/260; 375/345; 375/346
(58) Field of Classification Search ............. 375/229, 375/260, 267, 346, 347, 349, 345
See application file for complete search history.

(56) References Cited

U.S. PATENT DOCUMENTS

| | | | |
|---|---|---|---|
| 5,345,439 A | 9/1994 | Marston | |
| 5,825,807 A | 10/1998 | Kumar | |
| 5,838,728 A | 11/1998 | Alamouti et al. | |
| 5,946,292 A * | 8/1999 | Tsujishita et al. | 370/204 |
| 6,094,162 A | 7/2000 | Sullivan | |
| 6,310,513 B1 * | 10/2001 | Iemura | 329/304 |
| 6,317,456 B1 * | 11/2001 | Sayeed | 375/227 |
| 6,317,470 B1 * | 11/2001 | Kroeger et al. | 375/340 |
| 6,473,467 B1 * | 10/2002 | Wallace et al. | 375/267 |
| 6,598,200 B1 * | 7/2003 | Greenwood et al. | 714/774 |
| 6,628,724 B2 * | 9/2003 | Bannasch et al. | 375/259 |
| 7,058,002 B1 * | 6/2006 | Kumagai et al. | 370/203 |
| 2002/0057750 A1 * | 5/2002 | Nakao et al. | 375/345 |

FOREIGN PATENT DOCUMENTS

JP    10271088 A  * 10/1998

* cited by examiner

Primary Examiner—David B. Lugo

(57) ABSTRACT

A COFDM demodulator providing independent DQPSK symbol amplitude and phase equalization provides improved soft-symbol estimates by reducing the possibility of clipping in the differential demodulator, improving the tolerance of the differential demodulator to finite word length effects, correcting for phase drifting between adjacent subcarriers, and improving signal-to-noise ratio (SNR) calculation accuracy for maximal ratio combining applications. Separate acquisition and tracking modes for the amplitude and phase equalizers are provided that handle start-up, reacquisition, and steady-state operation of the demodulator.

30 Claims, 4 Drawing Sheets

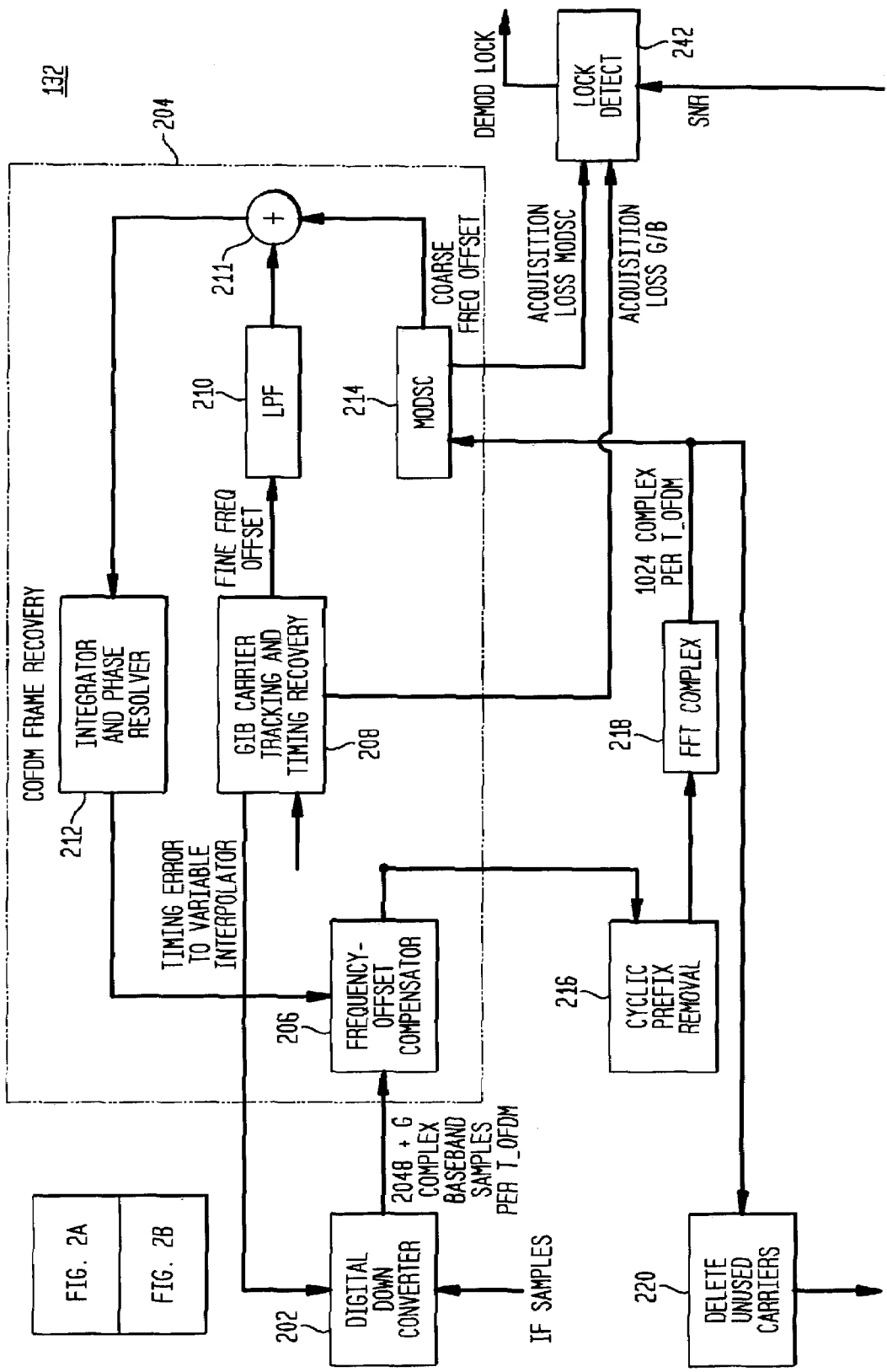

EQUALIZATION IN ORTHOGONAL FREQUENCY DOMAIN MULTIPLEXING

BACKGROUND OF THE INVENTION

1. Field of the Invention

The present invention relates to orthogonal frequency division multiplexing (OFDM) systems and, more particularly, to equalization within such systems.

2. Description of the Related Art

Over the past decade, orthogonal frequency division multiplexing (OFDM) has been exploited for wideband communication over mobile radio FM channels, asymmetric digital subscriber lines (ADSL), high-speed digital subscriber lines (HDSL), very high-speed digital subscriber lines (VHDSL), digital audio broadcasting (DAB), satellite digital audio radio services (SDARS), digital television terrestrial broadcasting (DTTB), digital video broadcasting (DVB), and HDTV terrestrial broadcasting.

OFDM is a block-oriented modulation scheme that maps N data symbols into N orthogonal carriers separated in frequency by $1/T_S$, where $T_S$ is the block (i.e., OFDM symbol) period. Multi-carrier transmission systems use OFDM modulation to send data bits in parallel over multiple, adjacent carriers (also known as subcarriers, tones, or bins). The fundamental operational details of OFDM are covered in U.S. Pat. No. 3,488,445, incorporated herein by reference in its entirety. An important advantage of multi-carrier transmission is that intersymbol interference due to signal dispersion (also known as delay spread) in the transmission channel can be reduced or even eliminated by inserting a guard interval between the transmission times of consecutive symbols. This minimizes the need for an equalizer, which is typically required in single-carrier systems. The guard interval allows energy from reflected or multipath copies of a symbol to die out before a subsequent symbol is received.

The basic principle of OFDM is to split a high rate data stream into a number of lower-rate streams that are transmitted simultaneously over a number of subcarriers within a defined frequency band. Since the symbol duration can increase for each of the lower-rate subcarriers, the effects of time dispersion caused by multipath delay spreads are decreased relative to single-carrier implementations. Further, because the information in the data stream is spread out over a large number of different frequencies (frequency diversity), the transmission is robust to narrowband interferers and fades. As a result, intersymbol interference is significantly decreased. During the guard interval typically added between symbols to further decrease intersymbol interference, it is common to cyclically repeat the OFDM symbol.

In practice, the most efficient way to generate the sum of a large number of subcarriers for transmission purposes is by using an inverse fast Fourier transform (IFFT) at the transmitter. At the receiver, an FFT can then be used to recover the subcarriers. All subcarriers differ by an integer number of cycles within the FFT integration time, which ensures the orthogonality between them. This orthogonality is maintained in the presence of multipath delay spread. Because of multipath, the receiver sees a summation of time-shifted replicas of each OFDM symbol. Ideally, as long as the delay spread is smaller than the guard time, there is theoretically neither intersymbol interference nor intercarrier interference within the FFT interval of an OFDM symbol. In practice, relative motion between the transmitter and receiver, non-ideal transmitter characteristics, noise and interferers, and an indefinite delay spread contribute to random phase and amplitude of each subcarrier at the receiver. To deal with weak subcarriers in deep fades, forward error correction (FEC) across the subcarriers is typically applied. The resulting "coded" OFDM (COFDM) system provides additional burst error robustness. However, this robustness comes at the cost of data throughput as a consequence of the redundancy overhead of the FEC. Additionally, to deal with amplitude and phase variations, it is common to provide some degree of equalization.

Even with the aforementioned safeguards, at any realistic power level, for transmitters and receivers that may be moving with respect to each other and with respect to potential interferers, some signal blockage or data loss is still likely to occur. To minimize the effect of this data loss, additional non-collocated transmitters are used (spatial diversity). In addition, the effect of burst errors that exceed the coverage of the FEC can be minimized by transmitting redundant copies of the signal at different times (temporal diversity). In both cases, data recovery is accomplished by consolidating the data from multiple unerrored segments of these temporally and spatially diverse copies into a single coherent data stream. One method to accomplish this is to assign a confidence weight to each symbol in each independent spatial and temporal stream at a receiver based on a calculated SNR for the symbol. A weighted average is then calculated via a maximal ratio combining (MRC) scheme resulting in an overall improvement in the receiver bit-error rate. This improvement is known as diversity gain.

Depending on the implementation, different bit modulation schemes may be employed within the COFDM scheme. For example, digital audio broadcast (DAB) employs differential quadrature phase shift keying (DQPSK) modulation, while DVB primarily uses quadrature amplitude modulation (QAM). Each of these modulation schemes provides unique advantages with respect to transmission channel characteristics.

In COFDM systems, time domain equalization (TEQ) is normally implemented to reduce the inter-symbol interference (ISI) for either QAM or DQPSK coding. For QAM coding, it is common to employ frequency-domain equalization (FEQ) techniques to combat both amplitude and phase errors caused by channel conditions. FEQ techniques jointly update coefficients to adapt for amplitude and phase simultaneously. However, currently, the techniques which involve jointly updating both amplitude and phase are difficult to implement for systems that use DQPSK coding.

SUMMARY OF THE INVENTION

Improvements to the prior art are presented in accordance with the principles of the present invention by providing independent DQPSK symbol amplitude and phase equalization subsystems in a COFDM demodulator. Separate acquisition and tracking modes for the amplitude and phase equalizers are provided that handle start-up, reacquisition, and steady-state operation of the demodulator. The amplitude equalization reduces the possibility of clipping in the differential demodulator and improves the tolerance of the differential demodulator to finite word length (e.g., fixed point) effects on the fast Fourier transform (FFT) that is used for subcarrier recovery. The phase equalization corrects for phase drifting that typically occurs in adjacent subcarriers of COFDM systems. Together, the independent amplitude and phase equalization of the present invention improves the soft symbol estimates of the DQPSK demodulator. In addition, the equalization improves the signal-to-noise ratio (SNR)

calculation accuracy of the demodulator, which in turn improves the operation of a maximal ratio combiner (MRC) used in space, time, and frequency diverse systems.

In one embodiment, the present invention is a method for demodulating OFDM signals, comprising (a) adjusting amplitude of symbols in an OFDM signal; (b) differentially demodulating the amplitude-adjusted symbols; and (c) adjusting phase of the demodulated symbols.

In another embodiment, the present invention is an OFDM signal demodulator comprising (a) an amplitude equalizer adapted to adjust amplitude of symbols in an OFDM signal; (b) a differential demodulator adapted to differentially demodulate the amplitude-adjusted symbols; and (c) a phase equalizer adapted to adjust phase of the demodulated symbols.

In yet another embodiment, the present invention is a receiver comprising at least two demodulators and a combining circuit. The demodulators are adapted to demodulate time, frequency, or space diverse versions of substantially identical transmitted data. At least one demodulator is an OFDM signal demodulator comprising (1) an amplitude equalizer adapted to adjust amplitude of symbols in an OFDM signal; (2) a differential demodulator adapted to differentially demodulate the amplitude-adjusted symbols; and (3) a phase equalizer adapted to adjust phase of the demodulated symbols. The combining circuit is adapted to process (i) outputs of the demodulators and (ii) signal-to-noise (SNR) estimates calculated from the outputs of the demodulators to recover the transmitted data.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Exemplary Communication System

Figure 1A:
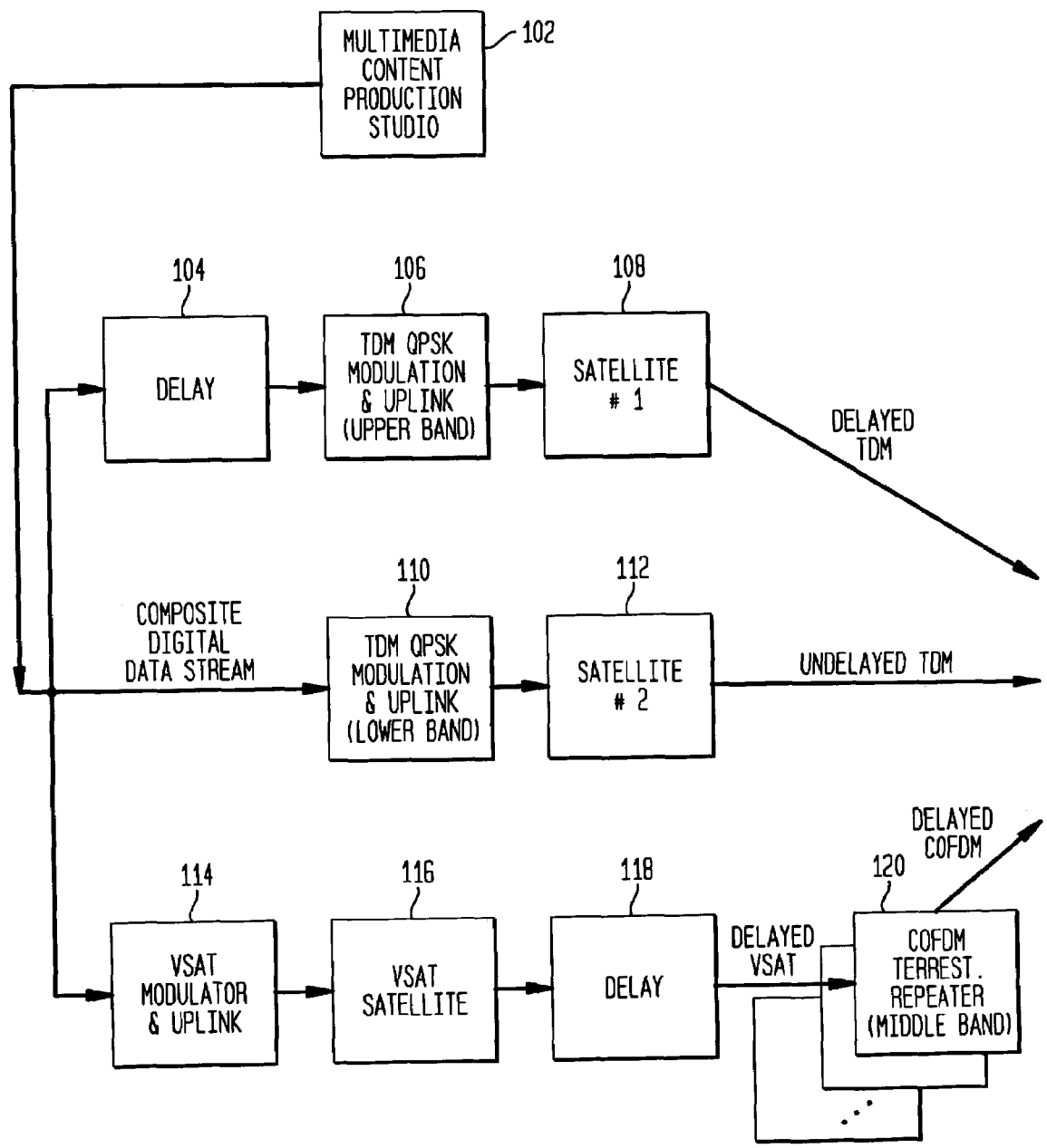
FIG. 1 is a block diagram of an exemplary space, time, and frequency diverse communication system in accordance with the present invention.
Figure 1B:
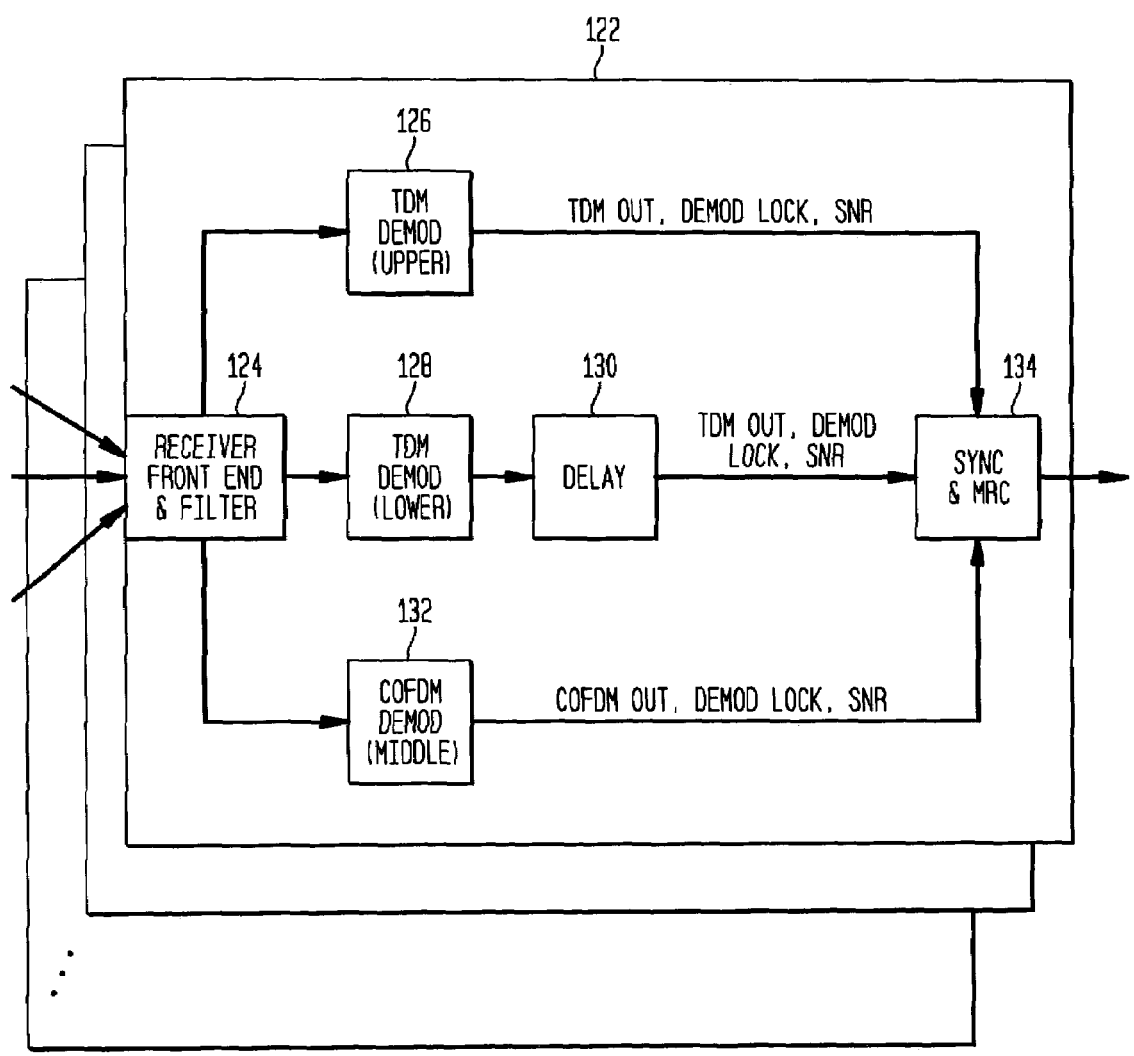

FIG. 1 illustrates one exemplary embodiment of a space, time, and frequency diverse communication system according to this invention. FIG. 1 depicts multimedia content production studio 102 where multiple streams of content (e.g., audio, video, voice) and content-descriptive and/or authorization-related data are combined into a composite digital data stream. This stream includes compressed and encrypted data along with forward error correction (FEC).

The composite stream is copied and transported to first and second time-division multiplex (TDM) modulation and uplink sites 106 and 110, respectively, as well as very small aperture terminal (VSAT) modulator & uplink site 114. Prior to being modulated and uplinked, the first TDM path is delayed (104) with respect to the other two streams. At the first and second TDM modulation and uplink sites 106 and 110, the composite stream copies are differential quadrature phase shift key (DQPSK) modulated, TDM framed, and then heterodyned to first and second uplink frequency bands. They are then amplified and uplinked to satellite #1 108 and satellite #2 112, respectively. The first and second TDM streams are then downlinked by satellites #1 and #2, respectively, on upper and lower frequency bands, respectively, to one or more (potentially mobile) ground-based receivers 122.

Meanwhile at VSAT modulator and uplink site 114, the composite stream copy is DQPSK-modulated, COFDM-modulated, VSAT-framed, and uplinked to VSAT satellite 116. A delay 118 substantially equal to delay 104 is then inserted in the VSAT path prior to downlink to one or more coded orthogonal frequency division multiplex (COFDM) terrestrial repeater sites 120. Each COFDM terrestrial repeater 120 strips the VSAT framing from the received VSAT stream and then retransmits the COFDM stream. The COFDM terrestrial repeaters transmit on a frequency that is substantially between the upper and lower frequency bands that correspond to the TDM streams. These COFDM signals also are received by one or more of ground-based receivers 122.

Note that delays 104 and 118 act to temporally align the first TDM stream and the COFDM stream at the mobile receivers. The delays also cause the first TDM stream and the COFDM stream to lag the second TDM stream. This time lag effects temporal diversity within the system.

Note also that the satellite orbits are offset in phase from each other such that the satellites are generally at different elevation and azimuth angles at any given point in time, thus minimizing the likelihood that the line of site from a receiver to more than one satellite will be blocked simultaneously. The third signal path from one or more COFDM terrestrial repeaters 120 serves to fill in any gaps in the rare circumstances where the line of site to both satellites is blocked. This arrangement effects significant spatial diversity within the system.

Finally, because each of the three streams is transmitted to the receivers at three distinct frequency bands (i.e., upper for the first TDM stream, middle for the COFDM stream, and lower for the second TDM stream), additional robustness is provided to the system via frequency diversity.

The Receiver

One or more receivers 122 are assumed to be within the beam patterns of one or more of the TDM satellites and COFDM repeaters at any given point in time. Each receiver includes front-end 124, which includes two antennas, one for reception of TDM satellite signals and one for reception of terrestrial COFDM signals. The radio frequency (RF) feed from the TDM antenna is fed to two tuners within the front-end which separate the two TDM signals according to their frequency bands and convert each to an intermediate frequency (IF). The RF feed from the COFDM receiver is likewise tuned and converted to IF. Each of the IF signals corresponding to the first and second TDM stream and the COFDM stream is then digitally sampled and output from front-end 124 to TDM demodulator (upper) 126, TDM demodulator (lower) 128, and OFDM demodulator (middle) 132, respectively.

The outputs of TDM demodulator 126 and COFDM demodulator 132 are next sent to synchronization and maximal ratio combining (MRC) circuit 134 along with the output of TDM demodulator 128 which has been delayed (130) by a time substantially equal to delay 104 and delay 118. Delay 130 serves to bring the temporally leading TDM stream from satellite #2 back in line temporally with the other two streams. Within circuit 134, framing information within the streams is used to delay one or more of the streams to achieve a bit-level synchronization between the streams. This effectively yields three recovered DQPSK modulated representations of the original content that was output from multimedia content production studio 102.

Also output from each demodulator to circuit 134 is a signal-to-noise ratio (SNR) estimate for each stream as well as a demod lock indicator. Within the MRC, each symbol is weighted according to the received SNR estimate with a relative figure of merit and added to the other symbols to create a weighted "soft" symbol, which is then processed by an (optionally soft) Viterbi decoder and Reed-Solomon error correction circuit to yield an estimate of the originally transmitted data.

COFDM Demodulator

Figure 2B:
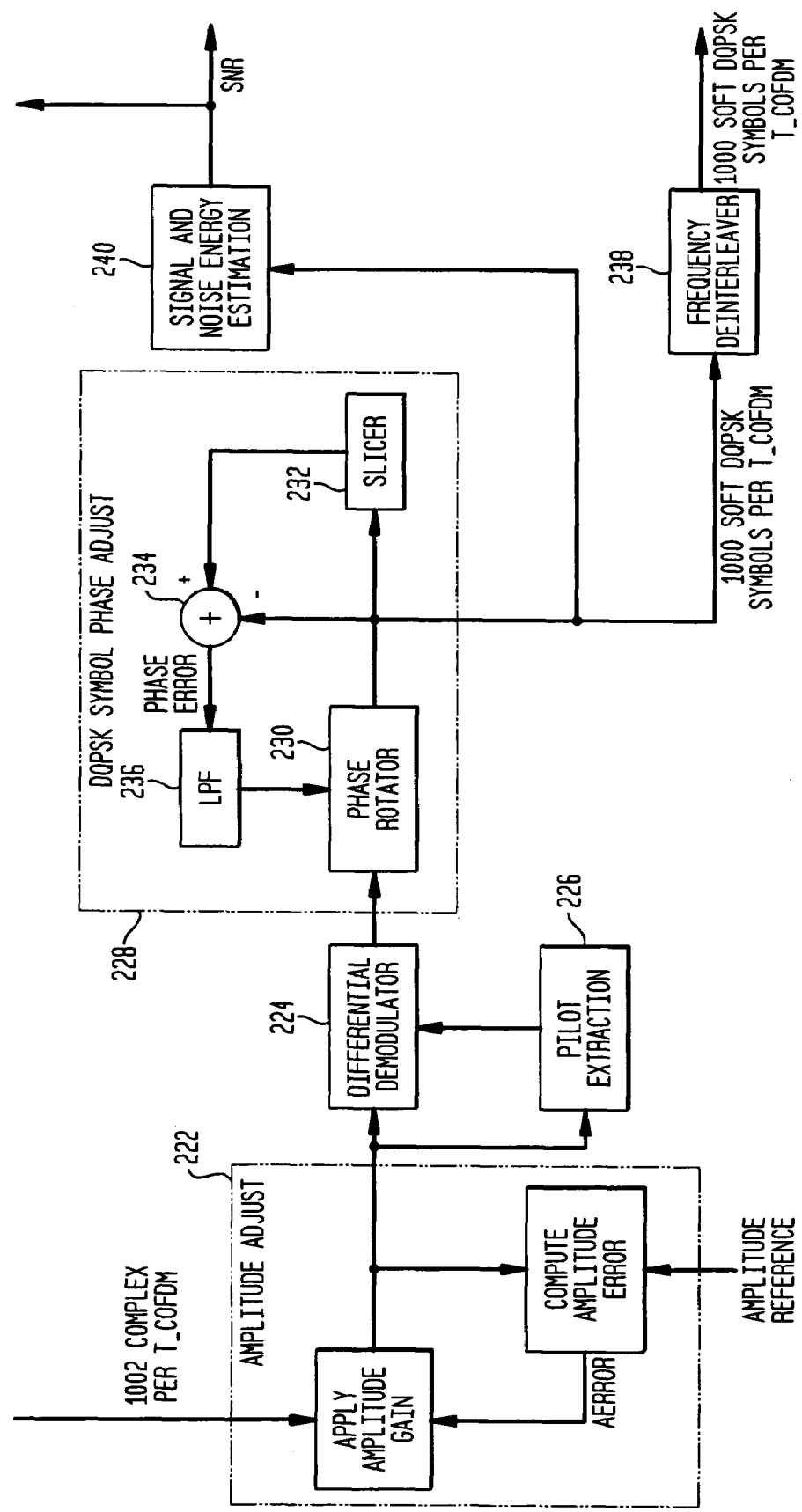
FIG. 2 is a block diagram of COFDM demodulator 132 of FIG. 1.

FIG. 2 is a block diagram of COFDM demodulator 132 of FIG. 1 according to one embodiment of this invention. In general, the present invention can be implemented for a wide range of different carrier bands, total carriers, data rates, interleaving schemes, error recovery mechanisms, and symbol modulation schemes (e.g., DQPSK). However, it is instructive, for the purposes of illustration of the concepts of this invention, to describe this invention in terms of a specific set of parameters. Therefore, it is assumed that the modulated COFDM signal includes 1000 data carriers, 2 pilot carriers, and 1 null carrier. It is further assumed that each carrier has been modulated using DQPSK, where each DQPSK symbol represents two bits of binary data. It is also assumed that the modulator takes advantage of the computational cost savings associated with the use of an inverse FFT and therefore transmits 1024 carriers, of which 21 are unused, and adds a guard interval (using cyclical extension of the IFFT output) to minimize intersymbol interference. It some systems, it is desirable to oversample (e.g., by a factor or 2x) the input signal to increase the receiver resolution. In this case a 2048 point FFT may be used instead of a 1024 point FFT.

The top-level function of the COFDM demodulator is to extract soft DQPSK symbols in {I, Q} format from the input sample stream using an FFT-based carrier recovery scheme followed by a DQPSK demodulator. Its major functions include digital down-conversion (DDC), gross- and fine-frequency offset detection and compensation, timing recovery, carrier recovery via FFT with time and frequency pruning, amplitude adjustment, carrier synchronization and differential demodulation, phase adjustment, frequency deinterleaving, lock detection, and signal-to-noise ratio (SNR) estimation.

Referring to FIG. 2, DDC 202 subsamples a 60 MHz digital complex IF stream down to a baseband rate of 2048+G complex samples per T_COFDM, where T_COFDM is the COFDM frame period and G is the number of complex symbols in the guard band of each transmitted COFDM frame. An oversampled 2x rate is employed. Each baseband sample consists of a pair of digital values {I, Q}, where I is considered the real part and Q is considered the imaginary part of the complex sample.

COFDM Frame Recovery

The first major operation on the baseband signals is the recovery of the COFDM frame. This is accomplished primarily by COFDM frame recovery subsystem 204. The first part of frame recovery is frequency-offset compensation. Frequency offsets are due to local oscillator variances and Doppler shifts due to relative motion between transmitter and receiver. These frequency offsets are corrected via rotation of the baseband {I, Q} samples within frequency-offset compensator 206.

The compensating phasor for this rotation is calculated from the filtered frequency-offset estimates that come from modulo sub-carrier (MODSC) acquisition circuit 214 and guard-interval-based (GIB) carrier tracking and timing recovery (GIB-CTTR) circuit 208. MODSC acquisition circuit 214 detects coarse frequency offsets to the nearest integer multiple of subcarrier spacing. It derives this information from FFT 218 performed downstream. GIB-CTTR circuit 208 performs fine-grained estimation directly from the frequency-offset compensator output by taking advantage of knowledge of the length and construction of the guard interval signal. It detects the carrier offset to within one half the inter-carrier spacing. The output of the GIB-CTTR circuit is low-pass filtered (210) to smooth the output of the frequency offset, combined (211) with the coarse grain frequency estimate from the MODSC acquisition circuit, and passed to integrator and phase resolver circuit 212. There, the offset estimates are integrated (smoothed) over multiple in oversampled 2x rate and then passed to frequency-offset compensator 206 (i.e., a phase rotator) to close the frequency-offset compensation extended feedback loop.

The second part of frame recovery is the correction of the DDC sampling rate. This is accomplished by passing timing-error information from GIB-CTTR circuit 208 to the variable interpolator within DDC 202. Together, the frequency-offset compensation and the timing-offset compensation in the DDC achieve proper COFDM frame synchronization.

Subcarrier Recovery

Now that the frame is properly identified, the guard interval (i.e., cyclic prefix) is removed (216) from the COFDM frame and the remaining 2048 samples are passed to FFT 218 for recovery of the subcarriers. For each block of 2048 complex samples input, the FFT outputs 2048 "frequency domain" complex samples. Each complex sample corresponds to a DQPSK symbol transmission opportunity for a corresponding orthogonal subcarrier of the transmission. Since the oversampled 2x rate is adapted, only 1024 subcarriers are actually available for data transmission. In the implementation exemplified by the embodiment of FIG. 2, for example, only 1003 subcarrieries (including two pilot and one null subcarrier) are actually modulated with content data. 1000 symbols with 2-bits per symbol are decoded for 1002 subcarriers (including two pilot carriers) to yield 2000 bits, which are considered one cluster frame in TDM and COFDM systems. The null subcarrier is used in MODSC (214) for the calibration of the coarse frequency offset. The unused subcarrier samples are thus deleted 220 (after appropriate consideration of their interleaving) in preparation for further DQPSK symbol processing.

Symbol Amplitude Adjustment

The next major function of the COFDM demodulator is amplitude adjustment (222) of the DQPSK symbols. In practice, the 1002 symbols output from the FFT are divided into two groups of 501, with one of the 501 symbols of each group serving as a pilot. Since both groups of symbols are demodulated in the same way, only one group will be discussed here. In addition, that fact that the symbols are in practice interleaved will be ignored, and the 0-th symbol will be assumed to be the pilot symbol, while symbols 1-500 will be assumed to be the content symbols. Let $o_i$ be the i-th symbol in the FFT output such that:

$$o_i = a_i + jb_i = r_i e^{j\omega_i} \tag{1}$$

where $a_i$ and $b_i$ are the real and imaginary parts of symbol $o_i$, and $r_i$ represents the amplitude of the symbol given its polar form $r_i e^{j\omega_i}$. Letting aerror$_i(n)$ and $g_i(n)$ be the amplitude error and amplitude gain, respectively, for the i-th symbol (corresponding to the i-th subcarrier) in the n-th COFDM frame, the gain is then calculated iteratively, according to equations (2) and (3) below, for $0 \leq i \leq 500$:

$$\text{aerror}_i(n) = \text{ref} - g_i(n)|a_i(n) + jb_i(n)| = \text{ref} - g_i(n)r_i(n) \quad (2)$$

$$g_i(n+1) = g_i(n) + \alpha_i \cdot \text{aerror}_i(n). \quad (3)$$

The variable ref in equation (2) represents the amplitude reference voltage (typically unity) fed to the amplitude adjust circuit 222. In equation (3), $\alpha_i$, the updating step-size of amplitude gain for subcarrier i, is typically between 0 and 1. Each gain-adjusted symbol, $s_i$, can then be calculated from equation (4) below:

$$s_i(n) = g_i(n) \cdot o_i(n). \quad (4)$$

The purpose of amplitude gain is to maintain the level of the signal at a nearly constant amplitude, e.g., 1.0. The use of amplitude adjustment at this stage of the processing of the received COFDM symbol is particularly advantageous since it normalizes each symbol prior to subsequent processing in the differential demodulator. This minimizes clipping in the demodulator. Clipping is a common problem in prior art COFDM demodulators of this type because of variable fading typical in the communication path and finite word length effects on the FFT processing.

DQPSK Demodulation

Following amplitude adjustment, the pilot symbol (also known as pilot tone) is extracted (226) and used as a phase reference in differential demodulator 224. In the differential demodulator, each DQPSK symbol is demodulated according to the relationship of equation (5) below where $c_i$ and $d_i$ are the real and imaginary parts of symbol $s_i$:

$$q_i = s_{i+1} s_i^* = (c_{i+1} + jd_{i+1})(c_i - jd_i) = e_i + jf_i \text{ for } 0 \leq i \leq 499 \quad (5)$$

or equivalently using polar notation where $p_i$ represents the amplitude of the symbol $s_i$ given its polar form $p_i e^{j\omega_i}$, equation (6) below;

$$q_i = s_{i+1} s_i^* = p_{i+1} p_i e^{j(\omega_{i+1} - \omega_i)} = p_{i+1} p_i e^{j\theta_i} \text{ for } 0 \leq i \leq 499 \quad (6)$$

This is done for each COFDM frame independently of the others. In the above notation, "*" represents the complex conjugate.

Symbol Phase Adjustment

For simplicity of illustration, in designing a DQPSK constellation, the four constellation points can ideally be set to:

$$\left(\frac{1}{\sqrt{2}}\cos\frac{\pi}{4}, \frac{1}{\sqrt{2}}\sin\frac{\pi}{4}\right), \quad (7)$$

$$\left(\frac{1}{\sqrt{2}}\cos\frac{3\pi}{4}, \frac{1}{\sqrt{2}}\sin\frac{3\pi}{4}\right), \quad (8)$$

$$\left(\frac{1}{\sqrt{2}}\cos\frac{5\pi}{4}, \frac{1}{\sqrt{2}}\sin\frac{5\pi}{4}\right), \quad (9)$$

$$\left(\frac{1}{\sqrt{2}}\cos\frac{7\pi}{4}, \frac{1}{\sqrt{2}}\sin\frac{7\pi}{4}\right). \quad (10)$$

The output of differential demodulator 224 will contain symbols $q_i$ for $0 \leq i \leq 499$, each of which will come close to one of the four constellation points. Following differential demodulation, these values for $q_i$ could be passed directly to frequency deinterleaver 238, and then to the maximal ratio combiner (MRC), Viterbi soft decoder, and other elements of the error correction and data recovery back-end (not shown). However, by first processing the symbols with DQPSK symbol phase adjust subsystem 228, the phase estimate can be significantly improved.

Phase-adjust subsystem 228 operates as follows. Given that $q_i$ is the i-th symbol output of differential demodulator 224 (equation (6)), let $\theta_i$ be the phase of $q_i$ which is rotated by phase rotator 230 and $\bar{\theta}_i$ be the adjusted phase out of phase rotator 230 corresponding to $\bar{q}_i$. $\bar{q}_i$ is fed to slicer 232 where its phase $\bar{\theta}_i$ is quantized to one of $$\left(\frac{\pi}{4}, \frac{3\pi}{4}, \frac{5\pi}{4}, \frac{7\pi}{4}\right)$$

corresponding to an "ideal" phase of the constellation. Let $\theta\text{ideal}_i(n)$ be the output of the slicer 232 at the n-th time interval (or COFDM frame) for the i-th subcarrier (i.e., symbol). This "ideal" phase is compared with the rotated phase $\bar{\theta}_i$ via differencer 234 to yield a phase error estimate. This estimate is then filtered using low-pass filter (LPF) 236 and the filtered output, $\theta\text{error}_i(n)$, is fed back to update phase rotator 230 according to the following equations:

$$\theta\text{error}_i(n) = \theta\text{ideal}_i(n) - \bar{\theta}_i(n) \quad (11)$$

$$\theta\text{correct}_i(n+1) = (1-\beta)\theta\text{correct}(n) + \beta\theta\text{error}_i(n) \quad (12)$$

$$\bar{\theta}_i(n+1) = \theta_i(n+1) + \theta\text{correct}_i(n+1) \quad (13)$$

In equation (12), $\beta_i$ is the step size of LPF 236. The step-size $\beta_i$ controls the rate of phase adjustment over time and it can be set independently for each subcarrier, $0 < \beta_i \leq 1$.

Following the phase correction, $\bar{q}_i$ is then passed to frequency deinterleaver 238 and passed along to the maximal ratio combiner (MRC), Viterbi soft decoder, and other elements of the error correction and data recovery back-end (not shown).

SNR and Lock Detect

The amplitude and phase corrected symbol estimates $\bar{q}_i$ are also passed to signal and noise energy estimation circuit 240. This circuit calculates an SNR estimate for each symbol and each subcarrier (or alternatively for each group of symbols and/or group of subcarriers), which it feeds to sync and MRC subsystem 134 (see FIG. 1) as well as to lock detect subsystem 242. Lock detect system 242 uses the SNR estimate along with acquisition loss indicators from both GIB-CTTR circuit 208 and MODSC acquisition circuit 214 to determine either a binary (or alternatively multilevel confidence value) demodulator lock indicator which is also passed to sync and MRC subsystem 134.

Acquisition and Tracking Modes

There are two operation modes in the COFDM demodulator. One is acquisition mode and the other is tracking mode.

In the acquisition mode, the amplitude gain is set to 1.0 and the amplitude gain adjustment function of amplitude adjustment subsystem 222 is disabled. Additionally, the value of $\theta\text{correct}_i$ is set to zero and phase rotator 230 of symbol phase adjust subsystem 228 is disabled. Acquisition mode can be invoked during initialization, training, or testing of the system, or following loss of lock in the receiver.

Following acquisition mode, and typically after receiver and demodulator lock are acquired, the demodulator is switched into tracking mode. While in tracking mode, the amplitude gain and phase rotator update as discussed previously.

CONCLUSION

An embodiment of the present invention has been presented which exemplifies the principles and advantages of the invention. By deploying independent amplitude and phase equalization in an OFDM demodulator, improved soft-symbol estimates can be obtained by reducing the possibility of clipping or underflow in the differential demodulator, improving the tolerance of the differential demodulator to finite word length effects on the carrier recovery system (e.g., FFT), and correcting for phase drifting between adjacent subcarriers. Additionally, incorporation of amplitude equalization allows not only improved accuracy in the SNR estimation but also the estimation to be done using a hardware or firmware module that is applicable equally well to the SNR estimation in a TDM system. This enables sharing of a common module design or instance between TDM and OFDM subsystems within a multimode receiver. The improved accuracy of the SNR estimation leads to improved performance of the OFDM subsystem in the context of a multimode receiver because of improved operation of the maximal ratio combining circuit. Separate acquisition and tracking modes for the amplitude and phase equalizers are provided that handle start-up, reacquisition, and steady-state operation of the demodulator. Ultimately, improved soft-symbol estimates lead to improved bit-error-rate (BER) performance given a particular degree of error correcting code coverage. Alternatively, or in addition, these improved estimates can allow reduction of the coding coverage and a corresponding increase in system data throughput at a given BER.

Some of the possible advantages of the present invention are improved SNR computational accuracy yielding improved MRC decisions, decreased clipping occurrence in conversion of differential demodulator outputs into soft symbol representation leading to improved performance of soft Viterbi and Reed-Solomon error correction schemes, correction of phase drifting that occurs between adjacent subcarriers of OFDM systems, decreased occurrence of incorrect mapping from small (near zero) value FFT outputs to DQPSK constellation points as a result of normalization achievable on a per subcarrier basis in the amplitude equalization subsystem, and sharing of an SNR estimation module between OFDM and TDM demodulators.

The present invention may be implemented as circuit-based processes, including possible implementation as a single integrated circuit, a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

What is claimed is:

1. A method for demodulating a time-domain OFDM signal having a plurality of time-domain OFDM frames, comprising:
   (a) transforming each time-domain OFDM frame into a frequency domain to recover a plurality of subcarriers;
   (b) determining an amplitude error for each subcarrier, independent of the other subcarriers;
   (c) adjusting the amplitude of each subcarrier based on the determined amplitude error for the subcarrier, independent of the determined amplitude errors for the other subcarriers;
   (d) differentially demodulating the amplitude-adjusted subcarriers to recover DQPSK symbols; and
   (e) adjusting the phase of the DQPSK symbols.

2. The method of claim 1, wherein the amplitude adjustment and the phase adjustment are independently optimized.

3. The method of claim 1, wherein the amplitude is adjusted such that clipping is avoided when differentially demodulating the amplitude-adjusted subcarriers.

4. The method of claim 1, wherein the OFDM signal is a COFDM signal.

5. The method of claim 1, wherein:
   adjusting the amplitude of each subcarrier comprises applying an amplitude gain to the subcarrier; and
   determining an amplitude error for each subcarrier comprises computing the amplitude error based on comparing the amplitude of the amplitude-adjusted subcarrier to an amplitude reference, wherein the amplitude error is used to adjust the amplitude gain.

6. The method of claim 1, wherein adjusting the phase of each DQPSK symbol comprises:
   (1) rotating the DQPSK symbol based on a phase error; and
   (2) comparing the phase of the rotated DQPSK symbol to the phase of a reference DQPSK symbol to update the phase error.

7. The method of claim 6, wherein the phase error is low-pass filtered before being used to rotate the DQPSK symbol.

8. The method of claim 1, wherein the OFDM demodulation includes an acquisition mode and a tracking mode, wherein:
   (a) during the tracking mode:
   adjusting the amplitude of each subcarrier comprises applying an amplitude gain to the subcarrier; and
      determining the amplitude error for each subcarrier comprises computing the amplitude error based on comparing the amplitude of the amplitude-adjusted subcarrier to an amplitude reference, wherein the amplitude error is used to adjust the amplitude gain; and
   (b) during the acquisition mode, the amplitudes of the subcarriers are not adjusted.

9. The method of claim 1, wherein the OFDM demodulation includes an acquisition mode and a tracking mode, wherein:
   (a) during the tracking mode, adjusting the phase of each DQPSK symbol comprises:
   (1) rotating the DQPSK symbol based on a phase error; and (2) comparing the phase of the rotated DQPSK symbol to the phase of a reference DQPSK symbol to update the phase error, and (b) during the acquisition mode, the phases of the DQPSK symbols are not adjusted.

10. The method of claim 1, further comprising processing the phase-adjusted DQPSK symbols using a soft-symbol, Viterbi decoder.

11. The method of claim 1, further comprising processing the phase-adjusted DQPSK symbols using a Reed-Solomon decoder.

12. The method of claim 1, further comprising processing the phase-adjusted DQPSK symbols to determine signal-to-noise ratio (SNR).

13. The method of claim 12, wherein the SNR is used in a maximal ratio combiner.

14. The method of claim 1, comprising using the phase-adjusted DQPSK symbols in a receiver that utilizes one or more diversity types corresponding to one or more of space, time, and frequency.

15. An OFDM signal demodulator for demodulating a time-domain OFDM signal having a plurality of time-domain OFDM frames, comprising:
(a) a transformer adapted to transform each time-domain OFDM frame into a frequency domain to recover a plurality of subcarriers;
(b) an amplitude equalizer adapted to:
determine an amplitude error for each subcarrier, independent of the other subcarriers; and
adjust the amplitude of each subcarrier based on the determined amplitude error for the subcarrier, independent of the determined amplitude errors for the other subcarriers;
(c) a differential demodulator adapted to differentially demodulate the amplitude-adjusted subcarriers to recover DQPSK symbols; and
(d) a phase equalizer adapted to adjust the phase of the DQPSK symbols.

16. The OFDM signal demodulator of claim 15, wherein:
the amplitude equalizer is adapted to equalize the amplitude of each subcarrier independent of the phase of the DQPSK symbol; and
the phase equalizer is adapted to equalize the phase of each DQPSK symbol independent of the amplitude of the subcarrier.

17. The OFDM signal demodulator of claim 15, wherein the amplitude equalizer is adapted to adjust the amplitude of each subcarrier by:
(1) applying an amplitude gain to the subcarrier; and
(2) computing an amplitude error based on comparing the amplitude of the amplitude-adjusted subcarrier to an amplitude reference, wherein the amplitude error is used to adjust the amplitude gain.

18. The OFDM signal demodulator of claim 15, wherein the phase equalizer is adapted to adjust the phase of each DQPSK symbol by:
(1) rotating the DQPSK symbol based on a phase error; and
(2) comparing the phase of the rotated DQPSK symbol to the phase of a reference DQPSK symbol to update the phase error.

19. The OFDM signal demodulator of claim 18, wherein the phase error is low-pass filtered before being used to rotate the DQPSK symbol.

20. The OFDM signal demodulator of claim 15, wherein the OFDM demodulator is adapted to operate in an acquisition mode and a tracking mode, wherein:

(a) during the tracking mode, the amplitude equalizer is adapted to adjust the amplitude of each subcarrier by:
(1) applying an amplitude gain to the subcarrier; and
(2) computing the amplitude error based on comparing the amplitude of the amplitude-adjusted subcarrier to an amplitude reference, wherein the amplitude error is used to adjust the amplitude gain, and (b) during the acquisition mode, the amplitude equalizer is adapted to leave the amplitudes of the subcarriers unchanged.

21. The OFDM signal demodulator of claim 15, wherein the OFDM demodulator is adapted to operate in an acquisition mode and a tracking mode, wherein:
(a) during the tracking mode, the phase equalizer is adapted to adjust the phase of each DQPSK symbol by:
(1) rotating the DQPSK symbol based on a phase error; and
(2) comparing the phase of the rotated DQPSK symbol to the phase of a reference DQPSK symbol to update the phase error, and
(b) during the acquisition mode, the phase equalizer is adapted to leave the phases of the DQPSK symbols unchanged.

22. A receiver comprising:
(a) at least two demodulators adapted to demodulate time, frequency, or space diverse versions of substantially identical transmitted data, wherein at least one demodulator is an OFDM signal demodulator adapted to demodulate a time-domain OFDM signal having a plurality of time-domain OFDM frames, the OFDM signal demodulator comprising:
(1) a transformer adapted to transform each time-domain OFDM frame into a frequency domain to recover a plurality of subcarriers;
(2) an amplitude equalizer adapted to:
determine an amplitude error for each subcarrier, independent of the other subcarriers; and
adjust the amplitude of each subcarrier based on the determined amplitude error for the subcarrier, independent of the determined amplitude errors for the other subcarriers;
(3) a differential demodulator adapted to differentially demodulate the amplitude-adjusted subcarriers to recover DQPSK symbols; and
(4) a phase equalizer adapted to adjust phase of the DQPSK symbols; and
(b) a combining circuit adapted to process (i) outputs of the demodulators and (ii) signal-to-noise (SNR) estimates calculated from the outputs of the demodulators to recover the transmitted data.

23. A method for demodulating OFDM signals, comprising:
(a) adjusting amplitude of symbols in an OFDM signal;
(b) differentially demodulating the amplitude-adjusted symbols; and
(c) adjusting phase of the demodulated symbols, wherein:
the demodulation of OFDM signals includes an acquisition mode and a tracking mode;
during the tracking mode, adjusting the amplitude comprises:
(1) applying an amplitude gain to symbols in each carrier of the OFDM signal; and
(2) computing an amplitude error based on comparing the amplitudes of amplitude-adjusted symbols to an amplitude reference, wherein the amplitude error is used to adjust the amplitude gain, and during the acquisition mode, the amplitudes of the symbols are not adjusted.

24. A method for demodulating OFDM signals, comprising:
(a) adjusting amplitude of symbols in an OFDM signal;
(b) differentially demodulating the amplitude-adjusted symbols; and
(c) adjusting phase of the demodulated symbols, wherein:
the OFDM demodulation includes an acquisition mode and a tracking mode;
during the tracking mode, adjusting the phase comprises:
(1) rotating the demodulated symbols based on a phase error; and
(2) comparing the phases of the rotated symbols to the phases of reference symbols to update the phase error, and
during the acquisition mode, the phases of the demodulated symbols are not adjusted.

25. An OFDM signal demodulator comprising:
(a) an amplitude equalizer adapted to adjust amplitude of symbols in an OFDM signal;
(b) a differential demodulator adapted to differentially demodulate the amplitude-adjusted symbols; and
(c) a phase equalizer adapted to adjust phase of the demodulated symbols, wherein:
the OFDM demodulator is adapted to operate in an acquisition mode and a tracking mode;
during the tracking mode, the amplitude equalizer is adapted to:
(1) apply an amplitude gain to symbols in each carrier of the OFDM signal; and
(2) compute an amplitude error based on comparing the amplitudes of amplitude-adjusted symbols to an amplitude reference, wherein the amplitude error is used to adjust the amplitude gain, and
during the acquisition mode, the amplitude equalizer is adapted to leave the amplitudes of the symbols unchanged.

26. An OFDM signal demodulator comprising:
(a) an amplitude equalizer adapted to adjust amplitude of symbols in an OFDM signal, wherein the amplitude equalizer is adapted to:
(b) a differential demodulator adapted to differentially demodulate the amplitude-adjusted symbols; and
(c) a phase equalizer adapted to adjust phase of the demodulated symbols, wherein:
the OFDM demodulator is adapted to operate in an acquisition mode and a tracking mode;
during the tracking mode, the phase equalizer is adapted to:
(1) rotate the demodulated symbols based on a phase error; and
(2) compare the phases of the rotated symbols to the phases of reference symbols to update the phase error, and
during the acquisition mode, the phase equalizer is adapted to leave the phases of the demodulated symbols unchanged.

27. A method for demodulating OFDM signals, comprising:
(a) adjusting amplitude of subcarriers in an OFDM signal;
(b) differentially demodulating the amplitude-adjusted subcarriers to recover symbols; and
(c) adjusting phase of the recovered symbols, wherein:
the demodulation of OFDM signals includes an acquisition mode and a tracking mode;
during the tracking mode, adjusting the amplitude comprises:
(1) applying an amplitude gain to each subcarrier of the OFDM signal; and
(2) computing an amplitude error based on comparing the amplitude of amplitude-adjusted subcarrier to an amplitude reference, wherein the amplitude error is used to adjust the amplitude gain, and
during the acquisition mode, the amplitudes of the subcarriers are not adjusted.

28. The method of claim 27, wherein the recovered symbols are DQPSK symbols.

29. A method for demodulating OFDM signals, comprising:
(a) adjusting amplitude of subcarriers in an OFDM signal;
(b) differentially demodulating the amplitude-adjusted subcarriers to recover symbols; and
(c) adjusting phase of the recovered symbols, wherein:
the OFDM demodulation includes an acquisition mode and a tracking mode;
during the tracking mode, adjusting the phase comprises:
(1) rotating each recovered symbol based on a phase error; and
(2) comparing the phase of the rotated symbol to the phase of a reference symbol to update the phase error, and
during the acquisition mode, the phases of the recovered symbols are not adjusted.

30. The method of claim 29, wherein the recovered symbols are DQPSK symbols.

* * * * *